United States Patent Office 3,239,512
Patented Mar. 8, 1966

3,239,512
17-TETRAHYDROPYRANYLETHER OF 4-CHLORO-TESTOSTERONE
Alexander D. Cross, Mexico City, Mexico, assignor to Syntex Corporation, Panama, Panama, a corporation of Panama
No Drawing. Filed Aug. 4, 1964, Ser. No. 387,512
2 Claims. (Cl. 260—239.55)

The present invention relates to novel cyclopentanophenanthrene derivatives and to a process for the production thereof.

More particularly the present invention relates to the 17β-tetrahydropyranylethers of 4-chloro-testosterone and 4-chloro-19-nor-testosterone.

In accordance with the present invention there has been made the surprising discovery that the anabolic activity of 4-chloro-testosterone and 4-chloro-19-nor-testosterone, especially when administered orally, is substantially enhanced when said compounds are converted into the corresponding 17-tetrahydropyranylethers. These ethers have, in addition to the mentioned anabolic activity, low androgenicity and are useful in the treatment of intestinal ulcers and in fertility control.

The novel compounds of the present invention are obtained from 4-chloro-testosterone or 4-chloro-19-nor-testosterone by treatment, under anhydrous conditions, with dihydropyrane in the presence of p-toluenesulfonic acid, preferably at room temperature for a period of about 10 hours to 4 days and, optionally, in a non polar organic solvent, e.g., a homocyclic aromatic solvent, such as benzene, toluene or xylene, thus affording the corresponding 17β-tetrahydropyranyloxy derivative.

The following specific examples serve to illustrate the present invention and should not be construed as a limitation of the scope thereof.

*Example I*

2 cc. of dihydropyrane were added to a solution of 1 g. and 4-chloro-testosterone in 15 cc. of benzene and about 1 cc. was distilled to remove moisture. 0.4 g. of anhydrous p-toluenesulfonic acid were added to the cooled solution, which was then allowed to stand at room temperature for 4 days. The solution was washed wtih sodium carbonate and water, dried and evaporated. The residue was chromatographed on 15 g. of neutral alumina. Crystallization of the fractions eluted with hexane from pentane yielded the 17-tetrahydropyranylether of 4-chloro-testosterone.

*Example II*

4-chloro-19-nor-testosterone (obtained by conventional saponification of the acetate thereof) was treated by the procedure described in Example I, thus giving the 17-tetrahydropyranylether of 4-chloro-19-nor-testosterone.

I claim:
1. The 17-tetrahydropyranylether of 4-chloro testosterone.
2. The 17 - tetrahydropyranylether of 4-chloro-19-nor-testosterone.

No references cited.

LEWIS GOTTS, *Primary Examiner.*